Figure 1:
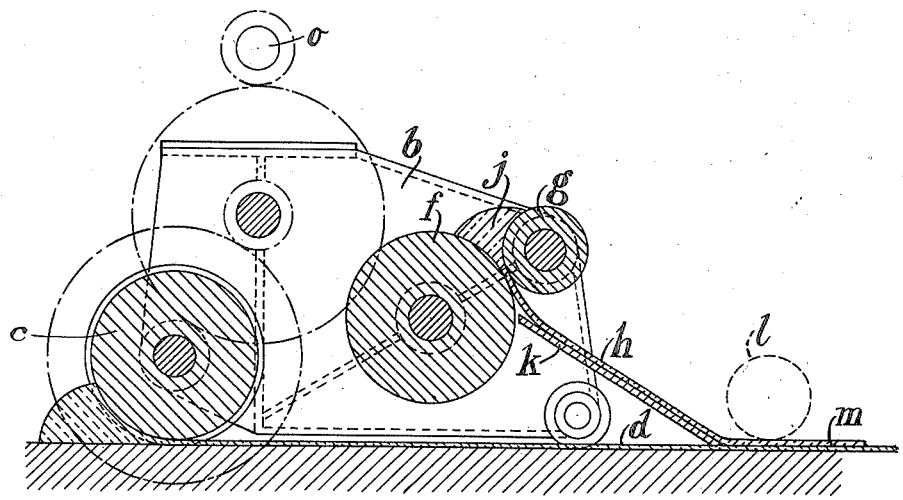

A. C. PILKINGTON.
METHOD OF MAKING FIGURED AND VARIEGATED GLASS PLATES.
APPLICATION FILED OCT. 7, 1907.

950,864.

Patented Mar. 1, 1910.

2 SHEETS—SHEET 1.

Witnesses

Inventor
Alfred Cecil Pilkington

By Dodge and Sons,
Associate Attorneys.

A. C. PILKINGTON.
METHOD OF MAKING FIGURED AND VARIEGATED GLASS PLATES.
APPLICATION FILED OCT. 7, 1907.

950,864.

Patented Mar. 1, 1910.
2 SHEETS—SHEET 2.

Witnesses

Inventor:
Alfred Cecil Pilkington,
By Dodge and Sons,
Associate Attorneys

UNITED STATES PATENT OFFICE.

ALFRED CECIL PILKINGTON, OF ST. HELENS, ENGLAND.

METHOD OF MAKING FIGURED AND VARIEGATED GLASS PLATES.

950,864.  Specification of Letters Patent.  Patented Mar. 1, 1910.

Application filed October 7, 1907. Serial No. 396,342.

*To all whom it may concern:*

Be it known that I, ALFRED CECIL PILKINGTON, subject of the King of Great Britain, residing at St. Helens, in the county of Lancaster, in the Kingdom of England, have invented certain new and useful Improvements in and in the Method of Making Figured and Variegated Glass Plates, for which application has been made in Great Britain, No. 5,118, dated March 2, 1907.

Hitherto figured glass plate has been made by rolling the metal in a more or less plastic condition either between a smooth roller and a figured roller or between a smooth table and figured roller, whereby the sheet of glass was produced smooth on one side and figured on the other, that is to say with a pattern in relief or in intaglio. Glass so formed, as will be obvious, is somewhat difficult to keep clean owing to dust and the like tending to lodge in the recesses caused by the figuring, into which recesses it is difficult to get a cloth or the like for cleaning purposes. By the present invention a figured glass plate is formed which is smooth on both its surfaces, so that the above-mentioned drawbacks are obviated.

In carrying out the invention the metal or glass in a more or less plastic state is rolled in two parts or sheets which are brought together and caused to adhere so as to form one compound plate. One of the sheets is rolled so as to be smooth on both sides while the other is rolled so as to be smooth upon one side and figured or variegated on the other, the figured surface of the second sheet being caused to lie against the first sheet so that when the two sheets are made to adhere the figured surface is in the interior of the resulting or compound plate of glass.

Various methods can be devised for carrying out the invention. The mass of plastic metal or glass may be placed upon a table and a traveling carriage caused to pass over the same so as to form a smooth sheet of glass. At the same time on another part of the carriage a further plastic mass is caused to pass between a smooth and a figured roller in such a way as to form a second sheet of glass which passes down and is caused to lie on top of the first formed sheet of glass. Instead of the carriage moving it may be stationary and the table underneath self-moved, or again both sheets of glass, the plain and figured one, may be formed by passing through rollers on a traveling carriage.

Figure 2:
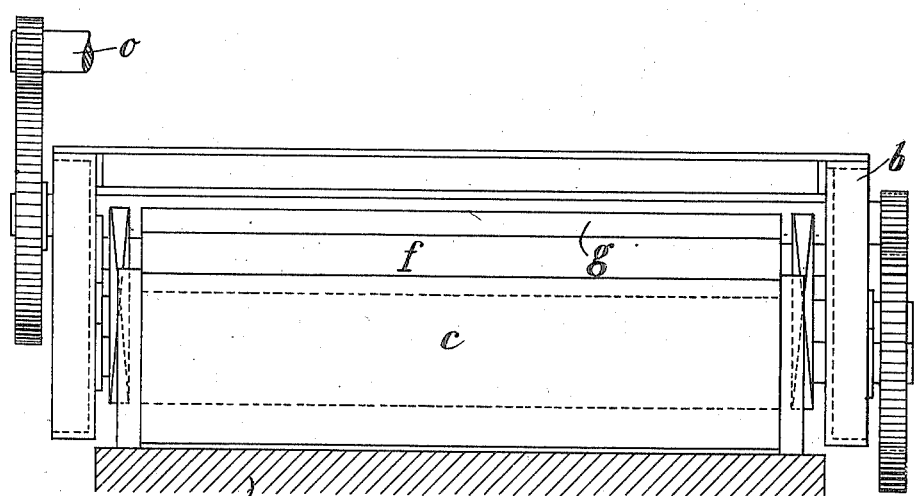
Figure 3:
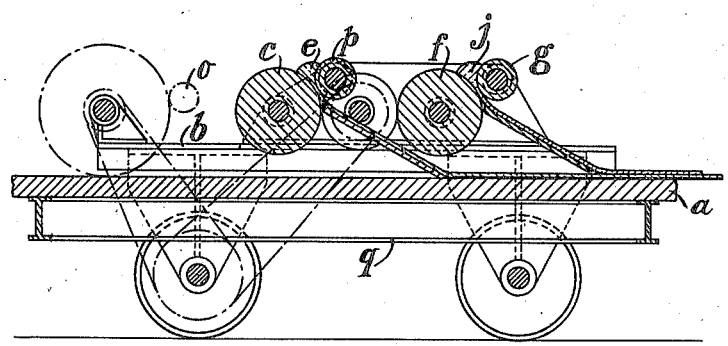
Figure 4:
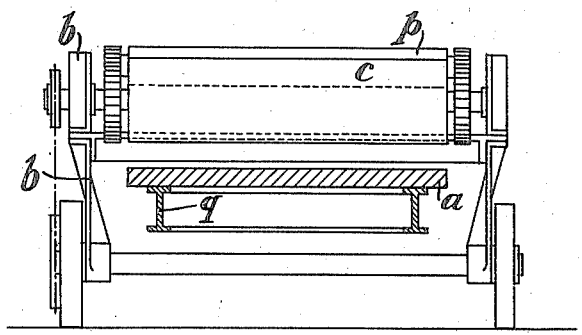

Referring to the accompanying drawings, wherein two different forms of apparatus for forming figured glass are shown by way of example:—Figures 1 and 2 are an end section and elevation of the device in which one of the sheets of glass is formed by being rolled on a table; while in Figs. 3 and 4 similar views are shown of apparatus in which both sheets of glass are formed by passing between rollers.

Referring to Fig. 1, $a$ is a table, $b$ a carriage carrying a plain roller $c$ which forms the under sheet of glass $d$ by rolling the plastic mass of metal or glass $e$ out upon the table. At the same time, and preferably driven from the same source of power as the roller $c$, two rollers $f$ and $g$ are arranged, of which the roller $f$ is figured and the roller $g$ plain. These two rollers form the second sheet of glass $h$ from the mass of plastic glass or metal $j$, and cause it to pass on to a suitable guide $k$ and from thence to the under sheet $d$.

If desired, a trail roller $l$ may be arranged to roll the compound plate of glass $m$ so formed. This compound plate of glass is then annealed in the ordinary annealing leers or stoves. As the roller $f$ is figured, it will be obvious that the figured surface of the single sheet $h$ will come to lie on top of the upper surface of the single sheet $d$, so that the compound plate of glass $m$ will have both its upper and under surfaces plain, but will have the figuring formed by the roller $f$ in its interior.

The mechanism as a whole is driven from any suitable motor by a shaft $o$. The gearing can be arranged in any suitable manner so long as the feeds of the two sheets of glass to form the compound sheet are equal.

In Figs. 3 and 4, instead of the roller $c$ pressing the mass $e$ upon the table $a$, a smaller roller $p$ is arranged which works in conjunction with the roller $c$, the two being arranged in a similar manner to the rollers $f$ and $g$. In this case it will be obvious that either the roller $p$ or the roller $f$ may be figured. In this latter case the rollers are supposed to be mounted upon a carriage $b$ moving over the table $a$, which in this case is supported by girders $q$.

I am well aware of U. S. patent to Hue, No. 355,649, dated January 4, 1887, wherein it is proposed to cover an embossed or figured surface produced upon glass by blowing against said surface a film or coating of glass, but for reasons obvious to those skilled in the art the apparatus and method set forth in said patent are not capable of producing the article set forth and claimed in this case.

I declare that what I claim is:—

1. As a new article of manufacture a plate of rolled glass showing a figuring or ornamentation and consisting of two sheets of glass one of them figured and the other plain firmly adhering together so as to form a single plate smooth on both sides.

2. As a new article of manufacture, a plate of rolled glass showing a figure or ornamentation and consisting of two sheets of glass, at least one of which is figured, said sheets firmly adhering together with the figured face innermost, so as to produce a single sheet substantially smooth on both sides.

3. The process of forming a plate of figured glass, which consists in rolling a sheet of figured glass in any ordinary manner and a sheet of plain glass in any ordinary manner, and placing one sheet upon the other while the sheets are in a heated state, with the figured surface of one sheet against a face of the other sheet, whereby the sheets are caused to adhere without alteration of the pattern.

4. The process of forming a plate of figured glass, which consists in rolling a sheet of figured glass in any ordinary manner and simultaneously a sheet of plain glass, placing the two sheets together while still plastic with the figured surface against a plain face of the opposite sheet, and finally pressing the two surfaces or faces lightly together so as to cause them to adhere without destroying the pattern.

5. The process of forming a plate of figured glass, which consists in rolling a sheet of glass having figures upon one surface in any ordinary manner and simultaneously rolling a sheet of plain glass; placing the figured surface against the plain sheet while the sheets are in a sufficiently plastic condition to cause them to adhere; and finally lightly rolling the sheets out on a level surface.

6. The process of forming a plate of figured glass, which consists in rolling a plurality of sheets of glass, at least one of which is figured upon one face, placing the figured surface against another sheet while the sheets are in a sufficiently plastic condition to cause them to adhere, and finally pressing the two contacting surfaces lightly together, so as to cause a union or adhesion between the same without destroying the pattern.

In witness whereof, I have hereunto signed my name this 25th day of September 1907, in the presence of two subscribing witnesses.

ALFRED CECIL PILKINGTON.

Witnesses:
JOHN H. DICKINSON,
JOHN DICKINSON.